United States Patent
Dawson et al.

(10) Patent No.: US 9,697,535 B2
(45) Date of Patent: Jul. 4, 2017

(54) SYSTEM AND METHOD IN A VIRTUAL UNIVERSE FOR IDENTIFYING SPAM AVATARS BASED UPON AVATAR MULTIMEDIA CHARACTERISTICS

(75) Inventors: Christopher J. Dawson, Arlington, VA (US); Rick A. Hamilton, II, Charlottesville, VA (US); Brian M. O'Connell, Cary, NC (US); Clifford A. Pickover, Yorktown Heights, NY (US); Keith R. Walker, Austin, TX (US)

(73) Assignee: International Business Machines Corporation, Armonk, NY (US)

(*) Notice: Subject to any disclaimer, the term of this patent is extended or adjusted under 35 U.S.C. 154(b) by 286 days.

(21) Appl. No.: 12/342,943

(22) Filed: Dec. 23, 2008

(65) Prior Publication Data

US 2010/0162403 A1 Jun. 24, 2010

(51) Int. Cl.
G06Q 30/00 (2012.01)
G06Q 30/02 (2012.01)
G06F 21/55 (2013.01)
G06Q 10/10 (2012.01)
H04L 12/58 (2006.01)

(52) U.S. Cl.
CPC ....... G06Q 30/0248 (2013.01); G06F 21/552 (2013.01); G06Q 10/107 (2013.01); H04L 12/585 (2013.01); H04L 51/12 (2013.01)

(58) Field of Classification Search
USPC ....................................................... 705/14.47
See application file for complete search history.

(56) References Cited

U.S. PATENT DOCUMENTS

| | | | |
|---|---|---|---|
| 5,852,672 A | 12/1998 | Lu | |
| 6,091,777 A | 7/2000 | Guetz et al. | |
| 6,907,571 B2 | 6/2005 | Slotznick | |
| 6,909,429 B2 | 6/2005 | Gottesman et al. | |
| 7,062,088 B1 | 6/2006 | Clauson | |
| 7,110,950 B2 | 9/2006 | Basso et al. | |
| 7,366,670 B1 | 4/2008 | Basso et al. | |

(Continued)

OTHER PUBLICATIONS

Final Office Action dated Dec. 30, 2010 for U.S. Appl. No. 12/115,706, filed on May 6, 2008.

(Continued)

Primary Examiner — Tsan-Yu J Huang
(74) Attorney, Agent, or Firm — William H. Hartwell; Maxine L. Barasch; Keohane & D'Alessandro PLLC

(57) ABSTRACT

A system and method in a virtual universe (VU) system for identifying spam avatars based upon the avatars' multimedia characteristics may have a table that stores multimedia characteristics of known spam avatars. It further may have an analysis unit that compares the multimedia characteristics of avatars against the multimedia characteristics of known spam avatars to determine if the avatar has known spam avatar characteristics. It may further have a scoring system to calculate a spam score based upon the similarities of the comparison and identifying the avatar as a spam avatar based upon the calculated spam score. It may further compare the calculated spam score with a spam score threshold wherein the avatar is identified as a spam avatar if the calculated spam score is equal to or greater than the calculated spam score. Multimedia characteristics include graphics, audio, movement, interactivity, voice, etc.

21 Claims, 6 Drawing Sheets

(56) References Cited

U.S. PATENT DOCUMENTS

| | | | |
|---|---|---|---|
| 7,721,107 B2* | 5/2010 | Golle et al. | 713/184 |
| 8,087,702 B2 | 1/2012 | Schmidt | |
| 8,416,847 B2 | 4/2013 | Roman | |
| 8,553,778 B2 | 10/2013 | Desimone et al. | |
| 8,656,476 B2 | 2/2014 | Dawson et al. | |
| 2003/0074397 A1 | 4/2003 | Morin et al. | |
| 2003/0081685 A1 | 5/2003 | Montgomery | |
| 2005/0097179 A1 | 5/2005 | Orme | |
| 2005/0108340 A1* | 5/2005 | Gleeson et al. | 709/206 |
| 2006/0036695 A1 | 2/2006 | Rolnik | |
| 2006/0136219 A1 | 6/2006 | Wang | |
| 2007/0032221 A1 | 2/2007 | Badt | |
| 2007/0078699 A1 | 4/2007 | Scott et al. | |
| 2007/0079379 A1 | 4/2007 | Sprosts et al. | |
| 2007/0083929 A1 | 4/2007 | Sprosts et al. | |
| 2007/0190990 A1 | 8/2007 | Yin | |
| 2007/0220607 A1 | 9/2007 | Sprosts et al. | |
| 2008/0022384 A1 | 1/2008 | Yee et al. | |
| 2008/0097946 A1 | 4/2008 | Oliver et al. | |
| 2008/0104180 A1* | 5/2008 | Gabe | 709/206 |
| 2008/0120558 A1 | 5/2008 | Nathan et al. | |
| 2008/0195713 A1 | 8/2008 | Benschop et al. | |
| 2008/0208674 A1 | 8/2008 | Hamilton et al. | |
| 2008/0208749 A1 | 8/2008 | Wallace et al. | |
| 2008/0215995 A1* | 9/2008 | Wolf | 715/758 |
| 2008/0235582 A1 | 9/2008 | Zalewski et al. | |
| 2008/0263446 A1* | 10/2008 | Altberg et al. | 715/706 |
| 2008/0303811 A1 | 12/2008 | Van Luchene | |
| 2009/0055484 A1 | 2/2009 | Vuong et al. | |
| 2009/0132361 A1* | 5/2009 | Titus et al. | 705/14 |
| 2009/0210505 A1 | 8/2009 | Thomas et al. | |
| 2009/0282075 A1 | 11/2009 | Dawson et al. | |
| 2009/0287566 A1 | 11/2009 | McAfee | |
| 2010/0162404 A1 | 6/2010 | Dawson et al. | |
| 2010/0306853 A1 | 12/2010 | Dawson et al. | |
| 2011/0041181 A1 | 2/2011 | Niccolini et al. | |
| 2014/0137229 A1 | 5/2014 | Dawson et al. | |

OTHER PUBLICATIONS

Final Office Action dated Apr. 5, 2011 for U.S. Appl. No. 12/115,706, filed on May 6, 2008.
U.S. Appl. No. 12/115,706, Office Action, Dec. 30, 2010, 23 pages.
U.S. Appl. No. 12/115,706, Office Action, Apr. 5, 2011, 16 pages.
U.S. Appl. No. 12/115,706, Office Action, Jun. 19, 2014, 17 pages.
U.S. Appl. No. 12/115,706, Office Action, Nov. 10, 2014, 16 pages.
Carlton Johnson, USPTO Office Action, U.S. Appl. No. 14/161,841, Notification Date Apr. 27, 2015, 29 pages.
U.S. Appl. No. 12/343,125, Office Action dated May 12, 2011, 37 pages.
U.S. Appl. No. 12/343,125, Office Action dated Sep. 19, 2011, 41 pages.
U.S. Appl. No. 12/343,125, Office Action dated Jan. 9, 2015, 30 pages.
U.S. Appl. No. 12/343,125, Notice of Allowance dated Jul. 6, 2015, 18 pages.
Johnson, U.S. Appl. No. 12/473,817, Office Action dated Dec. 8, 2011, 21 pages.
Johnson, U.S. Appl. No. 12/473,817, Final Office Action dated Jul. 3, 2012, 16 pages.
Johnson, U.S. Appl. No. 12/473,817, Office Action dated Oct. 23, 2012, 21 pages.
Johnson, U.S. Appl. No. 12/473,817, Final Office Action dated Feb. 25, 2013, 28 pages.
Johnson, U.S. Appl. No. 12/473,817, Office Action dated Aug. 16, 2013, 26 pages.
Johnson, U.S. Appl. No. 12/473,817, Notice of Allowance dated Oct. 8, 2013, 26 pages.
Johnson, U.S. Appl. No. 14/161,841, Office Action dated Aug. 29, 2014, 41 pages.
Johnson, U.S. Appl. No. 14/161,841, Final Office Action dated Oct. 2, 2014, 25 pages.
Sorkowitz, U.S. Appl. No. 12/115,706, Final Office Action dated Apr. 9, 2015, 34 pages.
Sorkowitz, U.S. Appl. No. 12/115,706, Office Action dated Jul. 14, 2016, 39 pages.
Johnson, U.S. Appl. No. 14/161,841, Notice of Allowance dated Feb. 11, 2015, 28 pages.
Johnson, U.S. Appl. No. 14/161,841, Final Office Action dated Nov. 5, 2015, 33 pages.
U.S. Appl. No. 12/343,125, Notice of Allowance, Jul. 15, 2015, 6 pgs.
Sorkowitz, Daniel, U.S. Appl. No. 12/115,706, Final Office Action, Nov. 28, 2016, 21 pgs.
U.S. Appl. No. 12/343,125, Notice of Allowance, Mar. 1, 2017, 27 pgs.

* cited by examiner

SYSTEM AND METHOD IN A VIRTUAL UNIVERSE FOR IDENTIFYING SPAM AVATARS BASED UPON AVATAR MULTIMEDIA CHARACTERISTICS

CROSS-REFERENCE TO RELATED APPLICATIONS

This patent application is related to co-pending patent application entitled "SYSTEM AND METHOD FOR IDENTIFYING AND BLOCKING AVATAR-BASED UNSOLICITED ADVERTISING IN A VIRTUAL UNIVERSE", filed on May 6, 2008, having U.S. Ser. No. 12/115,706.

FIELD OF THE INVENTION

Aspects of the present invention provides for the identification of avatar-based unsolicited advertising in a virtual universe. Using an embodiment of the present invention, an advertising and/or an offering for sale of virtual and real goods and services masquerading as a computer controlled avatar may be identified by analyzing multimedia characteristics of the avatar and rejected, if so desired.

BACKGROUND OF THE INVENTION

A computer avatar is a personalized graphic file or a rendering of personalized graphic files within a geometric frame that represents a computer user. There are basically two types of avatars: those used at websites, such as on Web exchange boards, and those used in gaming and virtual worlds. While Web users typically have two-dimensional graphic files as avatars, in virtual worlds, the avatar is typically a three-dimensional rendering of multiple graphic files layered on a geometric frame with controllable parts. A virtual world is an animated three-dimensional world created with computer-graphics imagery (CGI) and other rendering software. One of the hallmarks of a virtual world is that a user can interact within the environment by virtue of an avatar, or a computerized character that represents the user. The avatar manipulates and interacts with objects in the virtual world typically by mouse movements and keystrokes issued by the user. In simple terms, the avatar is a remote controlled character or proxy of the user. Avatars in a virtual world or virtual universe (VU) allow for a wide range of business and social experiences, and such experiences are becoming more important as business and social transactions are becoming common in VUs. In fact, the characteristics of an avatar play important social, business, and other related roles in VUs, such as a Second Life® virtual world. (Second Life is a registered trademark of Linden Research, Inc., commonly referred to as Linden Lab.) Second Life is a privately owned three-dimensional (3-D) virtual world, made publicly available in 2003 by Linden Lab, and is created entirely by its membership. Members assume an identity and take up residence in Second Life, creating a customized avatar or personage to represent themselves. The avatar moves about in the virtual world using mouse control and intuitive keyboard buttons. The Second Life client program provides users (referred to as residents) with tools to view, navigate, and modify the virtual world and participate in its virtual economy. Social and business interactions are important in Second Life, and these interactions include resident interactions in both personal and business meetings.

As the population of VUs increases, and as the density and intensity of personal activities and commercial transactions increase, greater emphasis will be placed on advertising. Just as in the real world, innovative and intrusive advertising activities will be launched and widely distributed. Unlike the real world, advertising in VUs is much less constrained by the limiting laws of physics and economics. Surprising new advertising campaigns and mechanisms may be deployed. One advertising mechanism marries unsolicited personal messaging ("spam") with the concept of automated computer controlled advertising avatars that roam around the VU looking to communicate with potential human-controlled avatars.

In some systems, advertisement avatars are automated. However, automated avatars can create problems within a VU if abused, much the same as spam email can cause problems in an email communication system, a.k.a., "avatar-based VU spam". Avatar-based VU spam has the potential to literally impede or block a user's motion in a VU, has the potential to impede lifelike transactions (e.g., business, romance) to devalue a user's virtual property and to block the avatar's line of sight.

Therefore, there exists a need for a solution that solves at least one of the deficiencies of the related art.

SUMMARY OF THE INVENTION

In general, aspects of the present invention provide for the identification of spam avatars, also called offering avatars, used for offering unsolicited advertising purposes, and, specifically, to the identification of spam avatars based upon the avatar's characteristics through analyses such as multimedia analysis.

One embodiment of the present invention is a method in a virtual universe (VU) system for identifying spam avatars, the VU system having one or more avatars that each have multimedia characteristics, the method may comprise retrieving from an avatar its multimedia characteristics, identifying the similarities of the retrieved multimedia characteristics with multimedia characteristics of known spam avatars and identifying the avatar as a spam avatar based upon the similarities.

One embodiment of the method of the present invention further may comprise calculating a spam score based upon the similarities and identifying an avatar as a spam avatar based upon the calculated spam score. It may further comprise comparing the calculated spam score with a spam score threshold wherein the avatar is identified as a spam avatar if the calculated spam score is equal to or greater than the calculated spam score.

The method may further comprise monitoring an avatar's movement wherein the movement is positional movement or wherein the movement is bodily movement. The multimedia characteristic of the avatar may be a graphic and the multimedia characteristic of a known spam avatar may be a graphic of a known spam avatar trademark.

One embodiment of the present invention is a system for identifying spam avatars based upon multimedia characteristics in a VU of the present invention may have a VU processing unit, a multimedia characteristics analysis unit, a memory unit that stores multimedia characteristics of known spam avatars, and a communications channel for allowing the VU processing unit, the memory unit and the multimedia characteristics analysis unit to exchange data. The spam avatar identification system may retrieve multimedia characteristics from an avatar, may retrieve the multimedia characteristics of known spam avatars from the memory unit, may identify similarities between the multimedia characteristics from the avatar and the multimedia characteristics of the known spam avatars, and may identify the avatar as a spam avatar based upon the similarities.

Another embodiment of the system of present invention may have a graphics recognition unit, an audio recognition unit, a video recognition unit, a speech to text conversion unit, an OCR/text look-up unit, a behavior/movement recognition unit, and an analysis unit that recognize the multimedia characteristics of the avatar.

Another embodiment of the present invention is a computer program product embodied in a computer readable medium for operating in a system comprising a network I/O, a CPU, and one or more databases, for implementing a method in a virtual universe (VU) system for identifying spam avatars, the VU system having one or more avatars that each have multimedia characteristics, the VU system having memory that stores multimedia characteristics of known spam avatars, wherein at least one of the avatars is a spam avatar, the method for identifying spam avatars comprising retrieving from an avatar its multimedia characteristics, identifying the similarities of the retrieved multimedia characteristics with multimedia characteristics of known spam avatars, and identifying the avatar as a spam avatar based upon the similarities.

Another embodiment is a method for deploying a computer infrastructure in a virtual universe (VU) for managing spam avatars, the VU having one or more avatars, at least one of the avatars being a spam avatar and at least one of the avatars having multimedia characteristics, the method comprising integrating computer-readable code into a computing system, wherein the code in combination with the computing system is capable of performing a process of identifying spam avatars, the process comprising retrieving the multimedia characteristics from one of the one or more avatars having multimedia characteristics, comparing the retrieved multimedia characteristics with multimedia characteristics of known spam avatars, identifying similarities between the retrieved multimedia characteristics with the multimedia characteristics of known spam avatars and determining whether the one of the one or more avatars is a spam avatar based upon the identified similarities.

Another embodiment of the system in a virtual universe (VU) for identifying spam avatar of the present invention, the VU system having one or more avatars that each have multimedia characteristics, wherein at least of the one or more avatars is not a spam avatar, the spam identifying system having memory that stores multimedia characteristics of known spam avatars and that stores a spam avatar identification table, and wherein the spam identification system has a VU processing unit for periodically distributing the spam identification table to the one or more avatars that is not a spam avatar.

BRIEF DESCRIPTION OF THE DRAWINGS

These and other features of this invention will be more readily understood from the following detailed description of the various aspects of the invention taken in conjunction with the accompanying drawings in which.

Figure 1:
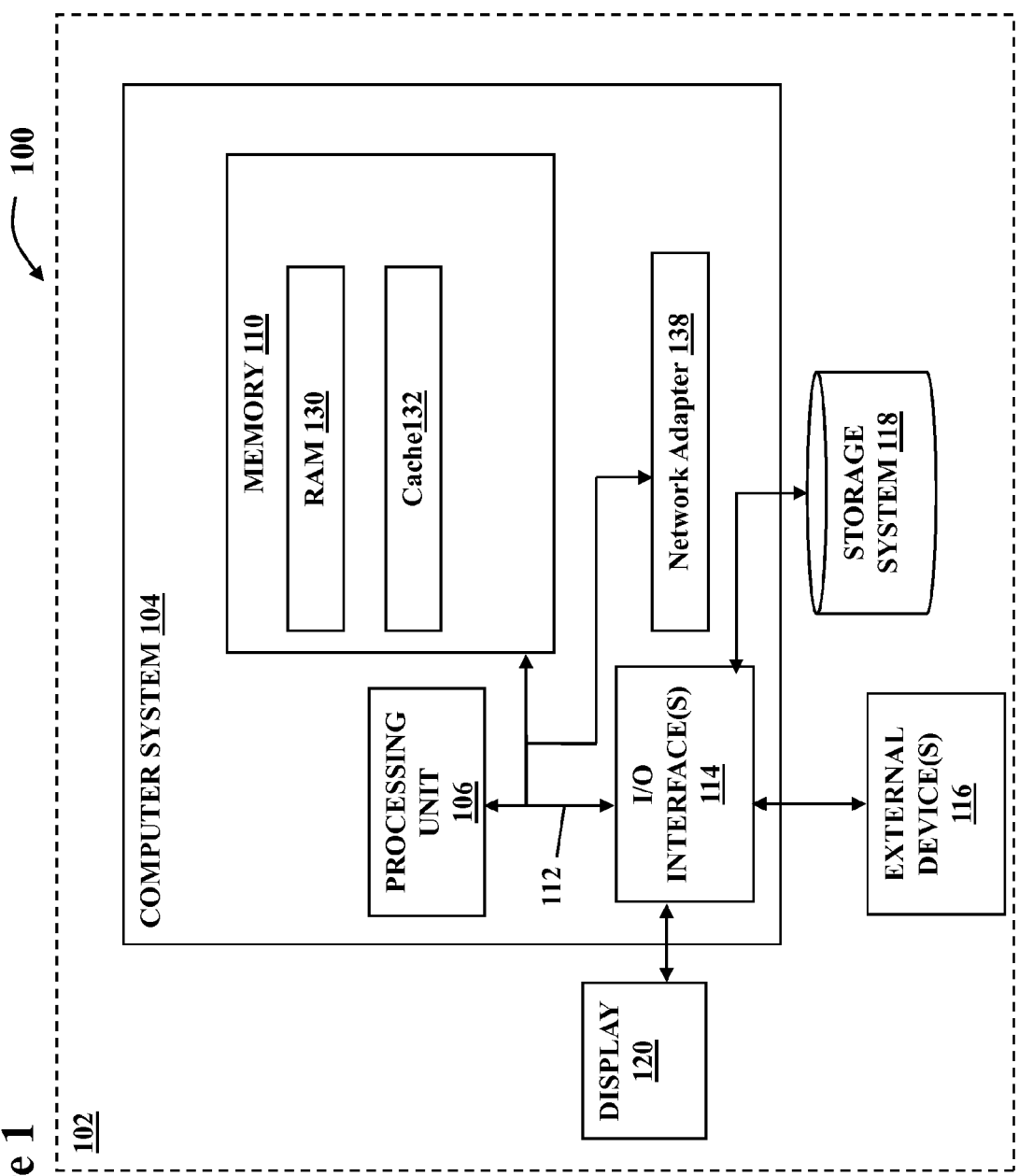
FIG. 1 shows a data processing system suitable for implementing an embodiment of the present invention.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION OF THE DRAWINGS

Aspects of the present invention provide a solution for identifying spam avatars used for offering unsolicited advertising purposes based upon the multimedia characteristics of the spam avatars. It may provide the ability to quickly identify such spam avatars. Any of the components of the present invention could be deployed, managed, serviced, etc. by a service provider who offers to identify spam avatars used for offering unsolicited advertising purposes based upon the multimedia characteristics of the spam avatar.

A data processing system 100, such as system 102 shown in FIG. 1, suitable for storing and/or executing program code of the present invention will include a computer system 104 having at least one processor (processing unit 106) coupled directly or indirectly to memory elements through a system bus 112. The memory elements can include local memory (RAM 130) employed during actual execution of the program code, bulk storage (storage 118), and cache memories (cache 132) that provide temporary storage of at least some program code in order to reduce the number of times code must be retrieved from bulk storage 118 during execution. Input/output or I/O devices (external devices 116) (including but not limited to keyboards, displays (display 120), pointing devices, etc.) can be coupled to the system either directly or through intervening I/O controllers (I/O interface(s) 114).

Figure 2:
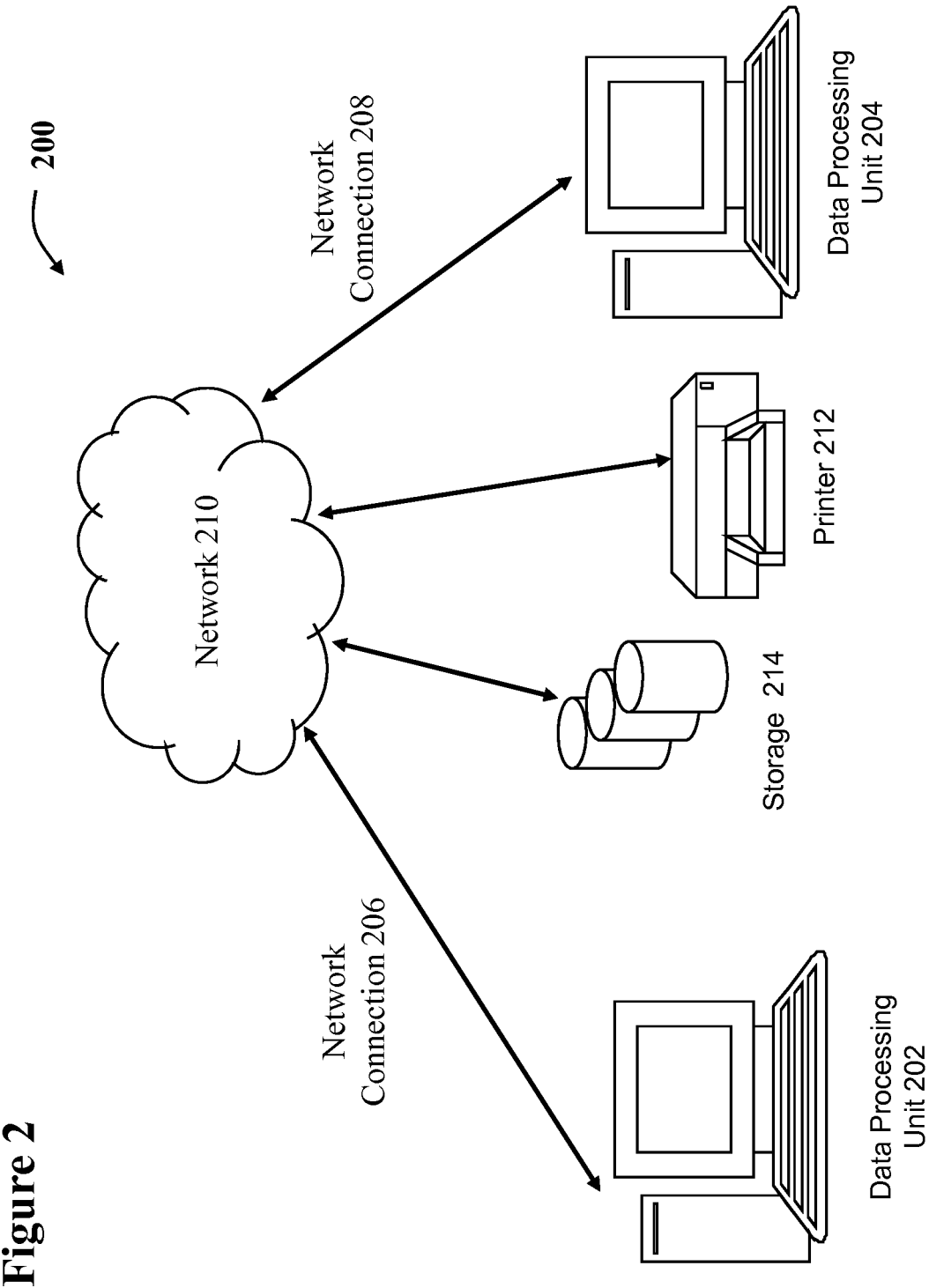
FIG. 2 shows a network which would work with an embodiment of the present invention.

Network adapters (network adapter 138) may also be coupled to the system 200 to enable the data processing system (as shown in FIG. 2, data processing unit 202) to become coupled through network connections (network connection 208) to other data processing systems (data processing unit 204), remote printers (printer 212) and/or storage devices (storage 214) through intervening private and/or public networks (network 210).

The present invention comprises a system and method of detecting, analyzing, and managing unsolicited advertisements to VU users through unsolicited communication made by human and computer controlled advertising avatars. Both the residents and owners of VUs would benefit from methods to reduce VU avatar spam such as described herein.

Residents (such as in Second Life) are represented in the environment by an avatar. The basic avatar is humanoid in shape that may be customized in a variety of ways:
  a series of GUI controls, modifying every aspect of the basic mesh (body shape, skin, hair style etc.);
  creating clothing or buying clothes made by other residents;
  attachments—3D objects intended to supplement or replace body structure, clothes or hair;
  animation overriders (intended to supplement or replace the stock set of animations) using, for instance, a scripting language such as Linden Scripting Language (LSL) to trigger animations stored in an animation file format such as Biovision Hiearchy (BVH); and/or sonic overriders—using a scripting language such as LSL to trigger sounds such as footsteps, or emotive cues such as laughing and crying.

The result can either be faithful to the original humanoid avatar, or can result in a completely non-humanoid representation of the character. These customizations can be packaged up into a single outfit, with common applications of outfits.

As noted above, the VU environment provides an opportunity for commercial vendors to market their wares and conduct other commerce with others who are resident in the VU via avatars. Many times, the commercial vendor will customize its avatar so that the avatar has readily distinguishable visual or audio characteristics. The purpose, of course, is to attract the attention of other avatars (potential customers) or to send unsolicited information about a product or service and so on ("advertisement") so that the commercial vendor's avatar ("offering avatar" or "spam avatar"), and ultimately the commercial vendor, may receive business as a result of the advertisement from one or more recipients of the advertisement ("receiving avatars"). Like all other types of unsolicited marketing via any communication means (e.g., telephone, fax, email, text messaging, etc.), it may be unwanted by one or more of the receiving avatars.

For the purpose of this invention, the term "offering avatar" or "spam avatar" refers to the avatar advertising a service or product. The terms "offering avatar" and "spam avatar" may be used interchangeably in this document. Furthermore, the term "receiving avatar" refers to an avatar that receives unsolicited information about a product or service.

Figure 3:
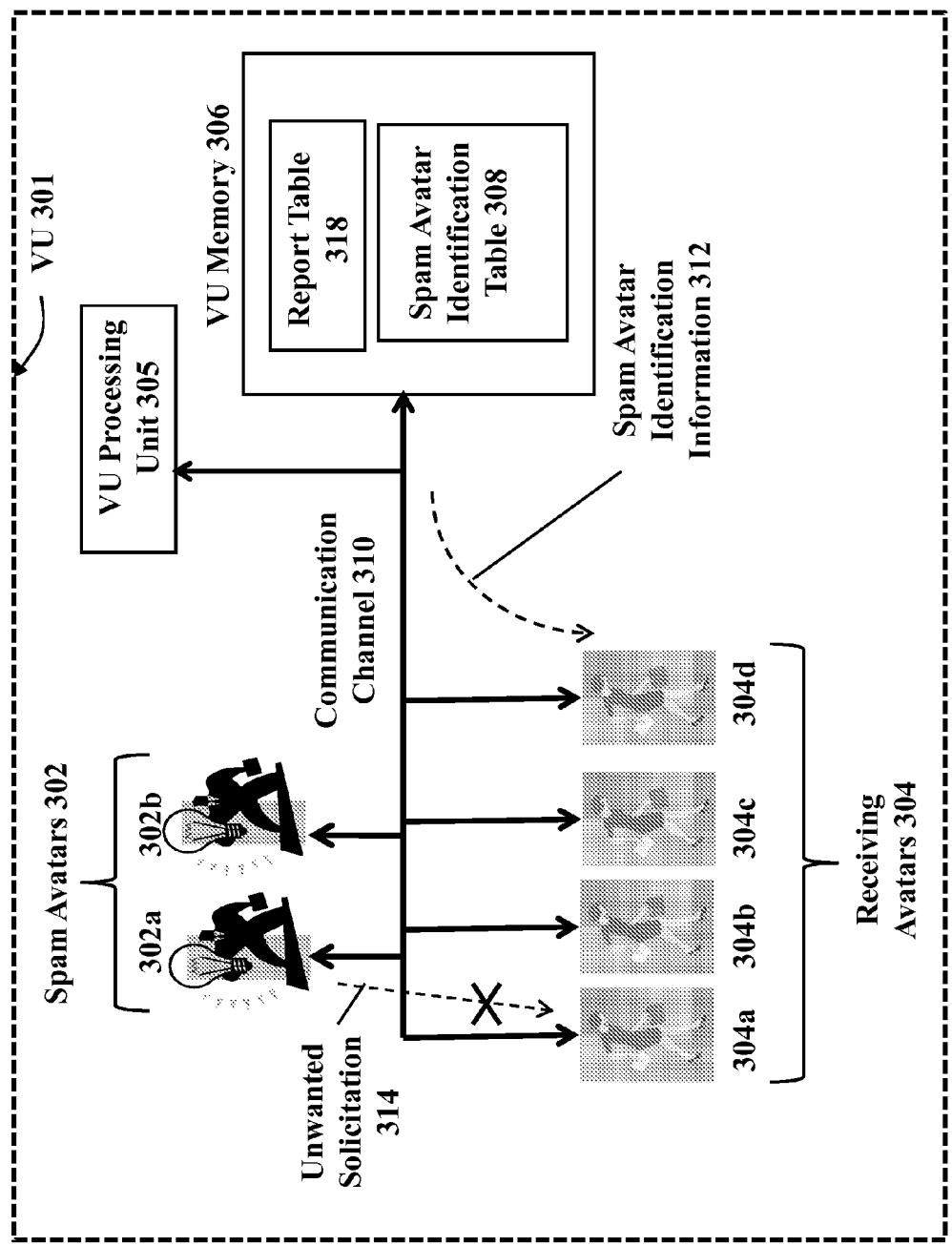
FIG. 3 illustrates an embodiment of the system of the present invention.

A simple avatar system 300 for implementing the present invention is shown in FIG. 3 having a VU 301 having a VU processing unit 305, a VU memory 306 for storing information about VU 301 and activities and avatars within VU 301, one or more spam avatars 302 (302*a*, 302*b*) and one or more receiving avatars 304 (304*a*, 304*b*, 304*c*, 304*d*). There can be any number of spam avatars 302 and receiving avatars 304. Spam avatars 302 and receiving avatars 304 can communicate with one another, amongst themselves and with VU memory 306 or other assets (such as avatar attachments, vehicles, buildings, furniture, sculpture or other items) in VU 301 via communications channel 310. Both spam avatars 302 and receiving avatars 304 are considered to be VU residents.

As noted above, there is a need for the receiving avatars to have the ability to identify the spam avatars so that the receiving avatars may block the unsolicited communications from the spam avatars should the receiving avatars so desire.

Receiving avatars may choose which solicitations to accept or reject. For instance, a receiving avatar may choose to accept all solicitations from all spam avatars, to accept solicitations from particular spam avatars and to reject all solicitations from all other spam avatars, or to reject all solicitations from all spam avatars.

One embodiment of the system and method of the present invention identifies VU spam via characteristics analysis wherein the characteristics are multimedia characteristics. In general, multimedia may include a combination of text, audio, animation, video, and interactivity content forms. It may include other forms, such as movement activities, as well.

Text, of course, is the representation of language in a textual medium through the use of signs or symbols and can be stored with the avatar in a text file, in such formats as MIME, ASCII and having the .txt filename extension. A text file can be provided as input to a text parser which translates specific sequences of characters as commands or values so that the text can be identified or recognized. An avatar may have a text file or other text describing the avatar—such as the avatar's name, its owner, its purpose, etc.—which may provide an indication as to whether the avatar is a spam or offering avatar.

Audio can be stored with the avatar in the form of various audio file formats, such as uncompressed formats such as a WAV file or a lossy compressed file format such as MP3. Audio recognition systems, such as voice recognition system, can distinguish sound patterns from other sound patterns. A spam avatar may have a distinguishing audio file associated with it which may indicate that it is a spam avatar. Examples of distinguishing audio characteristics include known jingles, known distinguishable spokesmen's voice characteristics, or even word patterns such as, "We can help you reduce your debt!", etc.

Still image characteristics may also assist in automatically determining whether an avatar is a spam avatar. For example, the spam avatar may visually look like known commercial figures such as, for example, Colonel Sanders™ or Ronald McDonald™. (Colonel Sanders and Ronald McDonald may be trademarks or registered trademarks of KFC Corporation and McDonald's Corporation, respectively, in the United States and elsewhere.) Or an image may be a known distinguishable trademark symbol such as The Golden Arches®. (The Golden Arches is a registered trademark of McDonald's Corporation.)

Animation creates an illusion of movement such as an avatar walking around, jumping up and down, shaking hands, etc., in the virtual universe. An avatar may display particular, known animation characteristics that may help indicate that that the avatar is a spam avatar. An example of an animation characteristic of a potential spam avatar may be that the avatar walks up to other avatars and offers to shake hands with each of the avatars. This could be coupled with a known word/voice pattern such as, "Hi! How are you? I can help you save money (lose weight, get a better insurance rate, etc.)."

The interactivity characteristics of an avatar may assist in determining whether the avatar is a spam avatar. For example, a non-interactive avatar, i.e., when an avatar's action or message is not related to previous actions or messages conveyed to or by him, may or may not indicate that the avatar is a spam avatar. Or, a reactive avatar, i.e., when an avatar's actions or messages are related only to one immediately previous action or message, may or may not indicate that the avatar is a spam avatar. Finally, an interactive avatar, i.e., when an avatar's actions or messages are related to a number of previous actions or messages and have a relationship between them, may or may not indicate that the avatar is a spam avatar. Interactivity is similar to the degree of responsiveness, and is examined as a communication process in which each message is related to the previous messages exchanged, and to the relation of those messages to the messages preceding them. An example of an interactivity characteristic that could be used to identify a computer operated offering or spam avatar could be that the avatar is only responsive to its own questions regarding its own products or services—not to unrelated responses. Similarly, a relative lack of distinct interactivity characteristics may reveal a spam avatar, given the human controlling a spam avatar or a programmed spam avatar is likely to be focused on a smaller set of tasks. As computer related spam avatars become more sophisticated however, corresponding detection schemes will need to become more sophisticated.

Combinations of these multimedia characteristics (such as voice, animation, interactivity, movement, etc.) can be examined together which may further assist in determining spam avatar characteristics.

Once spam avatars are identified, it is important that there is a record of the spam avatar for reference by receiving avatars and the VU. Referring again to FIG. 3, VU memory 306 has a spam avatar identification table 308 for storing spam avatar identification information preloaded and/or gathered as spam avatars are identified. This identification information is distributed to receiving avatars 304 from VU memory 306 and spam avatar identification table 308 via communication channel 310 (spam avatar identification information 312) for later use by receiving avatars 304. It should be noted that spam avatar identification information 312 could as easily be stored in a central location (i.e., spam avatar identification table 308) in the VU for easy access by receiving avatars 304. Receiving avatars 304 may use this spam avatar identification information 312 to reject an unwanted solicitation from an offering or spam avatar. For instance, spam avatar 302a sends an unwanted solicitation 314 to receiving avatar 304a. The client of the receiving avatar 304a parses unwanted solicitation 314 to find information about the sender such as the unique identifier, or UUID, and compares the UUID against the UUIDs of known spam avatars (stored in spam avatar identification information 312 stored either locally in the client of receiving avatar 304a or in VU server 308) to identify the sender as a spam avatar and, thus, to reject unwanted solicitation 314.

Receiving avatars may choose which solicitations to accept or reject. For instance, a receiving avatar may choose to accept all solicitations from all spam avatars, to accept solicitations from particular spam avatars and to reject all solicitations from all other spam avatars, or to reject all solicitations from all spam avatars.

VU Memory 306 may further have a report table 318 for storing information about an identified offering or spam avatar. For example, if an avatar is identified as a spam avatar, the UUID of the potential advertising asset, the UUID of the avatar associated with the asset, and any other information is added to report table 318, for later processing. An example of other information can include details of the multimedia characteristics that the avatar or asset characteristics were determined to be similar to, and a score can be calculated by a scoring system to convey probability of a match to be discussed further hereinbelow.

Figure 4:
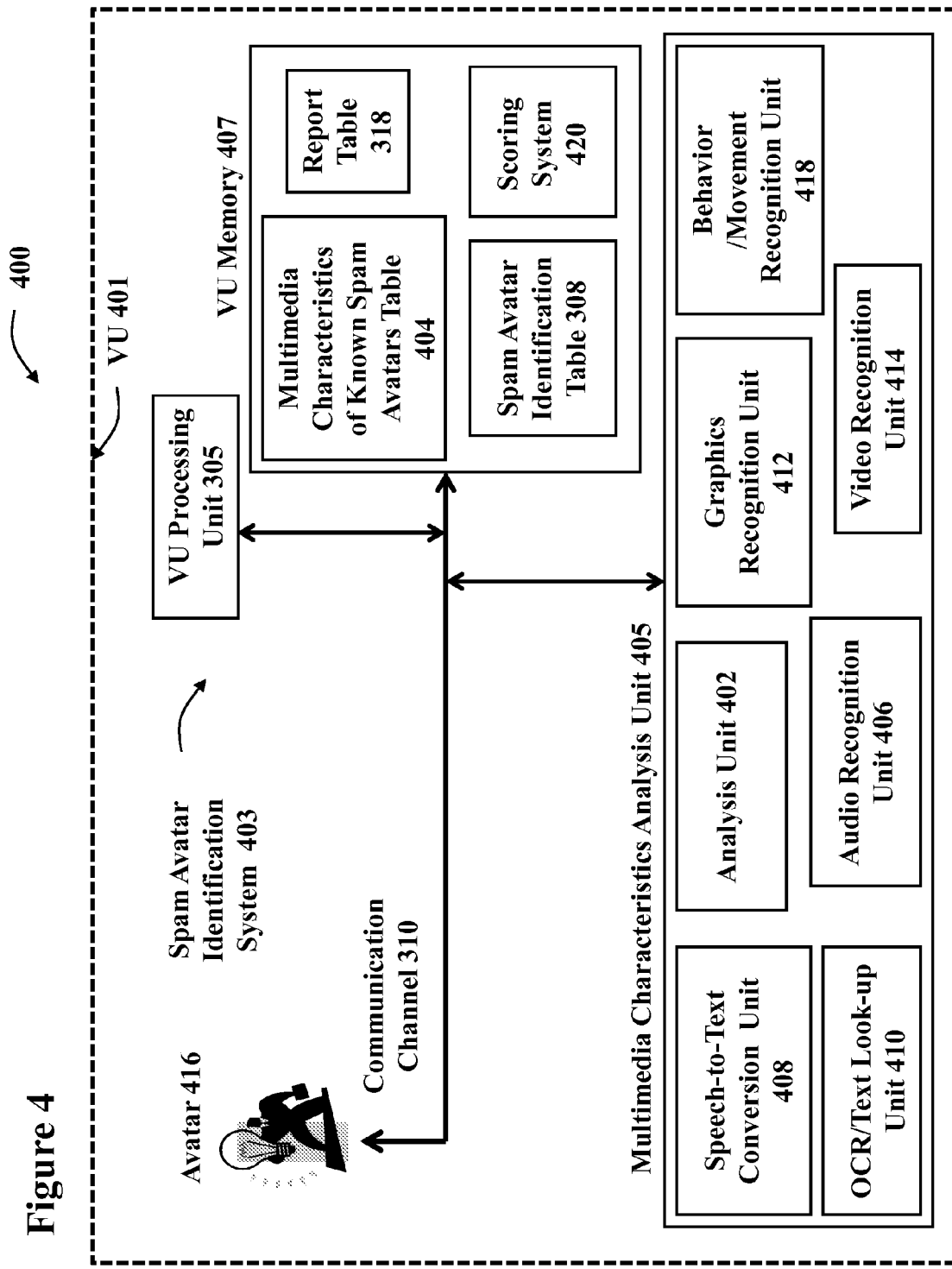
FIG. 4 illustrates an embodiment of the characteristics analysis system of the present invention.

Multimedia characteristics of the spam avatar can be retrieved and analyzed using a system such as one of the type shown in FIG. 4 as will be discussed further hereinbelow. System 400 may have VU 401 that may have a spam avatar identification system 403. Spam avatar identification system 403 may be used by system 400 to identify spam avatars in VU 401. Spam avatar identification system 403 may have a VU processing unit 305, a VU memory 407 and a communication channel 310 that may allow communications within VU 401 and a multimedia characteristics analysis unit 405.

As discussed in the context of FIG. 3, VU memory 407 may have a spam avatar identification table 308 that may store information about known spam avatars that exist, have existed or may exist in VU 401 and a report table 318 for storing information about an identified offering or spam avatar. VU memory 407 may have a multimedia characteristics of known spam avatars table 404 that may store multimedia files, such as, for example, graphics, text, or audio files, or files having data indicating movements or behaviors of known spam avatars. Multimedia characteristics of known spam avatars table 404 may be preloaded with multimedia information of known spam avatars and may be updated as such information becomes available. VU memory 407 may also have a scoring system 420. Scoring system 420 may be used by the spam avatar identification system 403 to track spam scores for avatars. Spam [for consistency—other than the first use of the term, there are no double quotes] scores may be used to identify a spam avatar if the avatar's spam score meets or exceeds a spam threshold. If so, the avatar may be identified as a spam or offering avatar. Spam scores for an avatar may be incremented or decremented by the similarities or dissimilarities between multimedia characteristics of the avatar being analyzed and the multimedia characteristics of known spam or offering avatars.

VU 401 further may have a multimedia characteristics analysis unit 405 that may retrieve, or obtain, and may analyze an avatar's characteristics, such as the multimedia characteristics of the avatar. For example, in FIG. 4, when an avatar 416 enters into VU 401, spam avatar identification system 403 may retrieve the avatar's characteristics, including the avatar's multimedia characteristics, for analysis. Analysis is likely to be performed upon creation of a new avatar, and at other times. Periodic analysis will help prevent users from bypassing the system by controlling avatars in a non-spam manner only after avatar creation. Examples of periodic analysis include a week after avatar creation, after an avatar change such as to the avatar's appearance or to a new or modified inventory asset, once a month, every 48 hours of online time, upon request of another resident, and at random times.

Multimedia characteristics analysis unit 405 may have an analysis unit 402 for providing analysis of information obtained from an avatar. Multimedia characteristics analysis unit 405 may also have a speech to text conversion unit 408 that may convert speech of an avatar to text so that the speech (possibly in the form of statements, instructions, queries, offers, etc.) may be parsed and programmatically understood. Multimedia characteristics analysis unit 405 may also have an OCR (optical character recognition)/text look-up unit 410 that may retrieve text from speech to text conversion unit 408 or otherwise and may look up the text. OCR/text look-up unit 410 may also retrieve text characters in the form of graphics that are recognized by an OCR portion and converted to text for look-up. Such text may indicate the avatar's name, company name or slogan, owner name or provide other information about the avatar. Information derived from speech to text conversion unit 408 and OCR/text look-up unit 410 may be passed to analysis unit 402 for providing analysis of the information. Multimedia characteristics analysis unit 405 may also have an audio recognition unit 406 that may retrieve audio files from an avatar for analysis. The audio files may be in any suitable file format, such as, for example, .wav or .mp3. Multimedia characteristics analysis unit 405 may also have a graphics recognition unit 412 that may retrieve graphics files from avatars. Graphics, or image, files may be in any suitable format such as, for example, JPEG (Joint Photographic Experts Group), TIFF (tagged image file format), GIF (graphics interchange format), or PDF (portable document format). Multimedia characteristics analysis unit 405 may also have a video recognition unit 414 that may retrieve video files from avatars. Video files may be of any suitable format such as MPEG-2, MPEG-4 or WMV, for example. Multimedia characteristics analysis unit 405 may also have a behavior/movement recognition unit 418 that may recognize behavior and movements of an avatar. A movement of an avatar can be considered to be any change in position of any part of the avatar (e.g., a hand gesture), of the entire avatar (e.g., movement of the avatar from one region in the VU to another) or a combination of the two. Behavior may be considered to be actions or reactions of the avatar, usually in relation to the environment. Behavior and movement characteristics, especially when coupled with audio (voice) characteristics, may indicate a spam avatar.

Analysis unit 402 may communicate with speech to text conversion unit 408, OCR/text look-up unit 410, audio recognition unit 406, graphics recognition unit 412, video recognition unit 414 and behavior/movement recognition unit 418. Analysis unit 402 may receive or retrieve information about an avatar from these units 408, 410, 406, 412, 414, and 418.

Analysis unit 402 may communicate with multimedia characteristics of known spam avatars table 404 of VU memory 306. This communication may be done by the analysis unit 402, the VU processing unit 305 or another unit within spam avatar identification system 403. Analysis unit 402 may retrieve multimedia files from multimedia characteristics of known spam avatars table 404 to compare against information that it may have received from text conversion unit 408, text look-up unit 410, audio recognition unit 406, graphics recognition unit 412, video recognition unit 414 or behavior/movement recognition unit 418. Analysis unit 402 may compare files of a single type, for example, audio files or even files having different formats, for example .wav file format files and .mp3 format files. Analysis unit 402 may also compare combinations of file types. For example, analysis unit 402 may compare a combination of a video file and an audio file combination received from video recognition unit 414 and audio recognition unit 406 with a video file and audio file combination of a known spam avatar received from multimedia characteristics of known spam avatars table 404 of VU memory 306. Analysis unit 402 may work with recognition units 408, 410, 406, 412, 414 and 418 to compare and analyze the multimedia files.

Analysis unit 402, together with units 408, 410, 406, 412, 414, and 418 is able to identify spam avatars from retrieved multimedia characteristics from avatars from the VU 401. Analysis unit 402 is further able to identify the magnitude of the similarities and/or dissimilarities of the comparison between retrieved multimedia characteristics of the existing avatar and the retrieved multimedia characteristics of the known spam avatar. The comparison information may be passed to scoring system 420 so that a spam score for that particular existing avatar can be tabulated by scoring system 420. Spam scores may then be recorded by scoring system 420 in spam avatar identification table 308 for later use.

Figure 5:
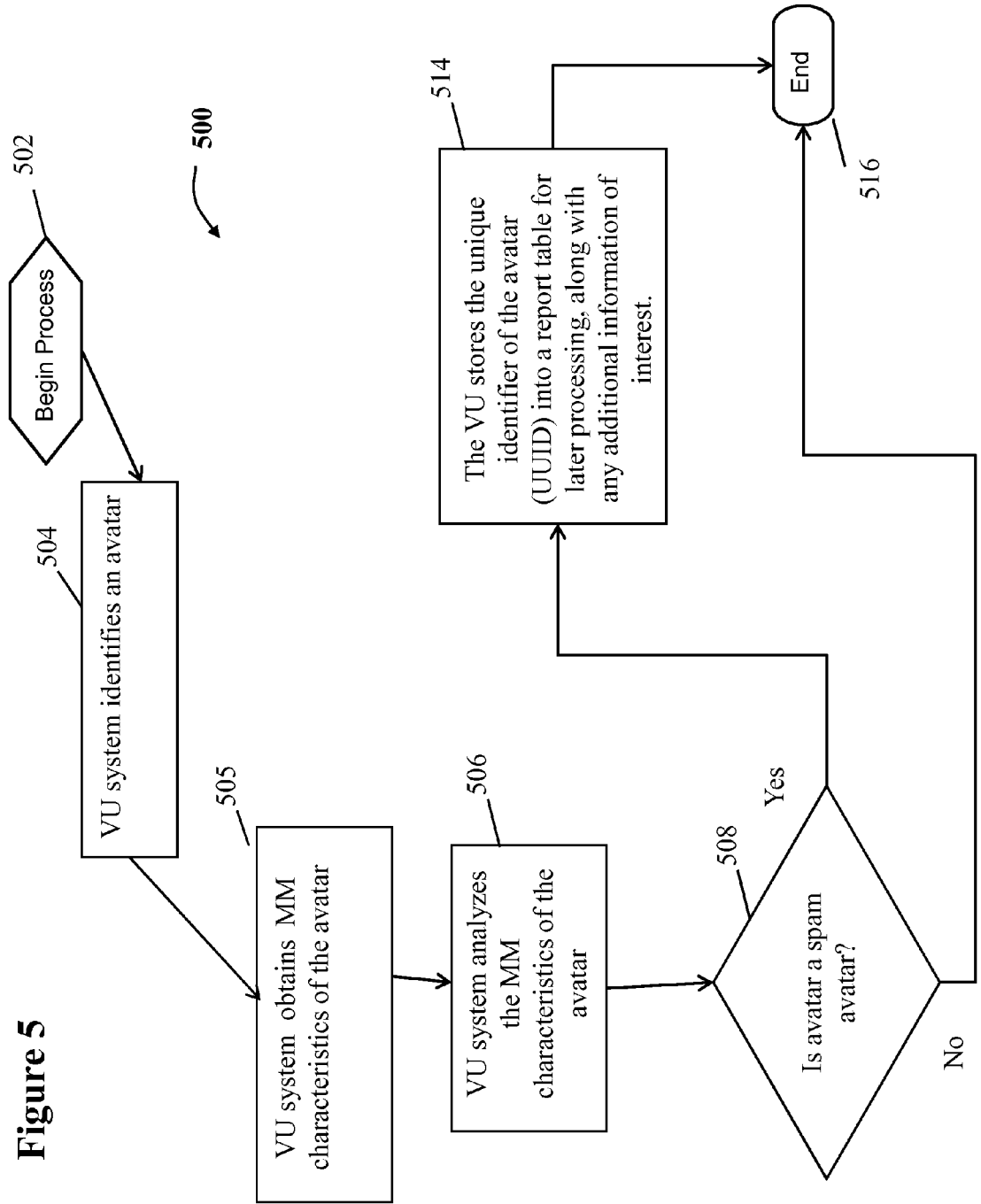
FIG. 5 illustrates the steps associated with an embodiment of the method of the present invention.

FIG. 5 illustrates a method 500 for identifying a spam avatar based upon identifying characteristics of the spam avatar such as multimedia characteristics, and the method starts at 502. This method may be invoked upon avatar creation, avatar modification, asset creation, asset modification, resident request, and on a schedule. This is shown at step 504. At step 505, VU system obtains the multimedia characteristics and, at 506, analyzes the characteristics of the avatar. In the case of multimedia characteristics, the multimedia files of the avatar and assets are passed to or retrieved by the multimedia characteristics analysis unit 405 for analysis. For example, with respect to image or graphics files, analysis unit 402 may use an image look-up process (that may include communicating with graphics recognition unit 412 and with multimedia characteristics of known spam avatars table 404 of VU memory 306). Analysis unit 402 may retrieve and analyze graphics for similarity to known logos, trade dress, and other images that connote an advertisement. The graphics of the avatar and assets may be passed through OCR/text look-up unit 410 to determine if there is any similarity to known trademarks, service marks, slogans, and other text that connote an advertisement. Depending upon the magnitude of the similarity, a spam score may be assigned to the examined avatar by the scoring system 420 and may be stored in the spam avatar identification table 308.

If the avatar has a concept of audio assets, the entirety or a random selection of the audio clip can be passed through audio (or audio pattern) recognition unit 406 for similarity to known jingles, radio commercials, and other audio that connote an advertisement. Additionally, speech to text conversion can be processed by speech to text conversion unit 408 and passed to OCR/text look-up unit 410. Behavioral/movement recognition may be performed by behavioral/movement recognition unit 418. If the avatar has a concept of video textures, then random graphic snapshots of the video can be processed the same way as discussed above. This may be done by video recognition unit 414 and graphics recognition unit 412. The audio component of the video can be processed the same manner. This may be done by audio recognition unit 406.

Analysis unit 402 may assist to provide analysis capability to units 408, 410, 406, 412, 414 and 418 and to retrieve multimedia files for analysis from multimedia characteristics of known spam avatars table 404. Depending upon the magnitude of the similarity, a spam score may be assigned to the examined avatar by scoring system 420 and may be stored in spam avatar identification table 308.

At 508, it is determined whether the avatar is a spam avatar and, if the avatar is a spam avatar, the UUID of the potential advertising asset, the UUID of the avatar associated with the asset, and any other information is added to a report table 318, for later processing at step 514. The process ends at 516. If it is determined that the avatar is not a spam avatar, the process ends at 516.

Figure 6:
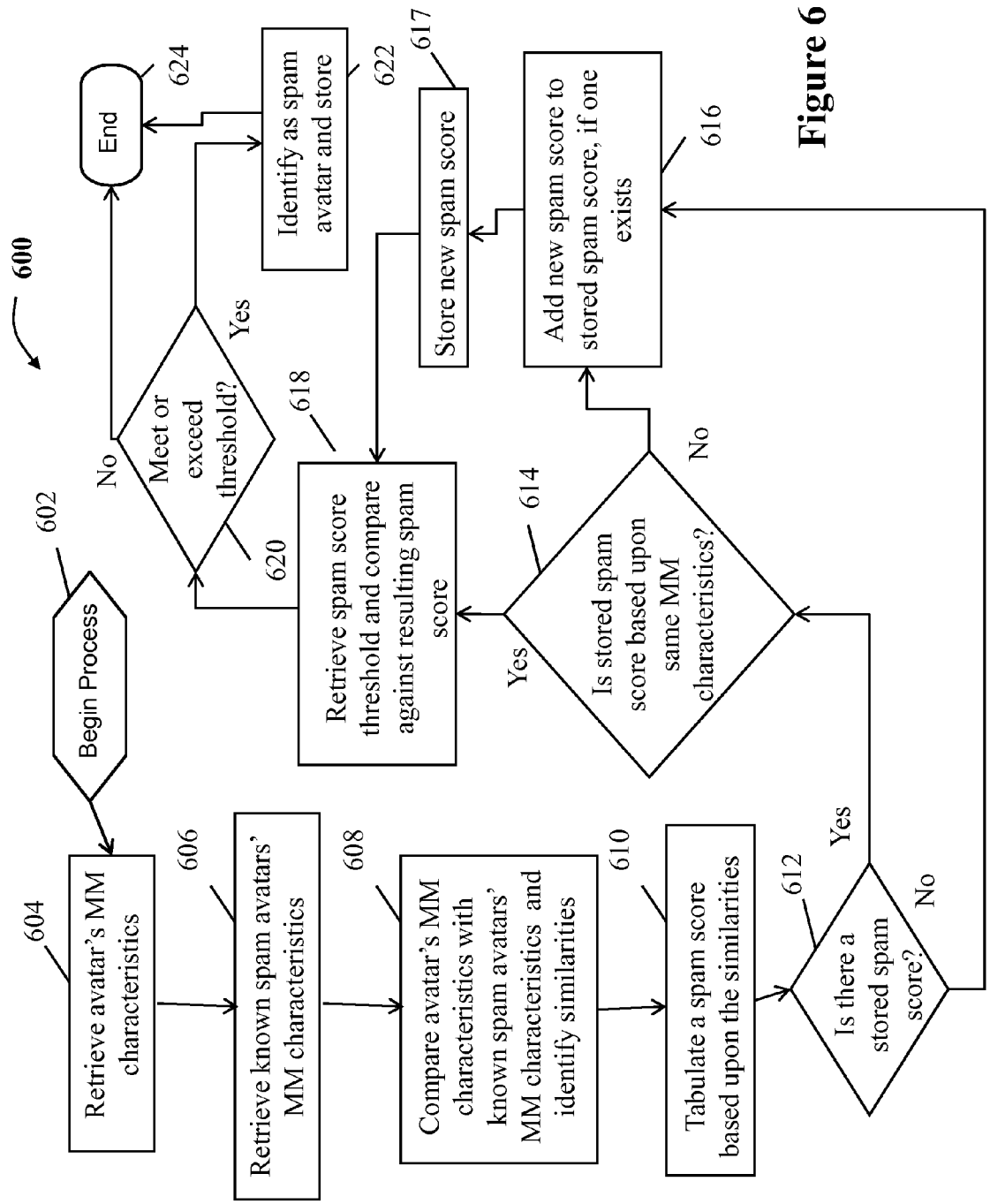
FIG. 6 is an illustrative embodiment of the method of the present invention for identifying spam avatars by calculating a spam score.

An example of an embodiment of the present invention for determining whether an examined avatar is a spam avatar is shown in FIG. 6 to be discussed below. An example of other information can include details of the multimedia characteristics that the avatar or asset characteristics were determined to be similar to, and a score may be calculated by scoring system 420 to convey probability of a match. Scoring system 420 can be described as a system using any statistical method known in the field, such as using the percentage of similarity as the score, or weighting certain types of multimedia as relatively greater or lesser (such as putting greater emphasis on the more mature field of OCR since it may be considered to be a more reliable indicator).

FIG. 6 is an illustrative embodiment of method 600 of the present invention for determining whether an avatar is a spam avatar which starts at 602 after an avatar has been identified. It is noted that the avatar may be a new avatar being created, a new avatar entering into a new area in the VU, changes made to an existing avatar, a scheduled or requested analysis of the avatar, etc. At 604, the multimedia characteristics of the avatar are retrieved. As noted with respect to the system of the type described in relation to FIG. 4, multimedia characteristics can be such characteristics as sound, voice, image, video, text, movement, behavior, etc. At 606, the multimedia characteristics of known spam avatars are retrieved and compared, at 608, against the retrieved multimedia characteristics of the avatar to determine the similarities between the multimedia characteristics of the avatar and the multimedia characteristics of known spam avatars. Note that these steps can performed serially in a repeatable, loop fashion for each multimedia characteristic of the avatar and for each of the known spam avatars or done in parallel. At 610, a spam score is determined for the avatar. At 612, it is determined whether there is a spam score previously stored for the avatar. If so, at 614, it is determined whether the stored spam score is based upon the same multimedia characteristics (or some of the same multimedia characteristics) as are presently being compared. The intent is that scores from previously analyzed characteristics should not accumulate based upon the fact that they are reanalyzed. If not (at 612 and 614), add spam score (based on multimedia characteristics not previously analyzed and scored) to stored spam score to form a sum new spam score at 616 and the updated spam score is stored at 617. If the new spam score is based upon the same multimedia characteristics that formed the basis of the stored score, the new spam score is not added to the related stored spam score. At 618, a spam score threshold is retrieved and compared against the new spam score and at 620 it is determined whether the new spam score meets or exceeds the spam score threshold. If so, at 622, the avatar is identified as a spam avatar and stored as such in the spam avatar identification table 308 and the process ends at 624. If the new spam score does not meet or exceed the spam score threshold at 620, the process ends at 624. In some embodiments, the spam score may influence a schedule of when the avatar may be analyzed again. For example, a relatively low spam score may decrease the frequency or delay the next analysis, whereas a relatively high spam score still below the threshold may increase the frequency or move up the next analysis. In such embodiments, randomness may be applied to the schedule to decrease the likelihood that a user may predict when such analysis will occur, thus reducing the likelihood of bypassing the analysis. For example, a random time modifier within a range may be applied to delay or move up the next analysis relative to any other schedule determiner.

As discussed above, the UUID of the avatar, the score of the test, and other information such as date and time of test and index of questions or methods used in the test is added to a report table, for later processing. Rapid discrimination of spam avatars from other avatars may have a number of other applications including:

- allowing some VU owners to optionally enforce a spam policy;
- allowing some VU owners to optionally identify users that need to pay the VU owner for a license to solicit with a spam avatar;
- allowing some VUs to optionally publicize whether a given avatar is a spam avatar; or
- decisions by land, building, and region owners to deny access to spam avatars (for business and social reasons).

Thus, periodic determination, and optional publication, of software-versus-human control for avatars has impact to unsolicited advertising, and to many other segments of Virtual Universe interaction.

It should be understood that the present invention is typically computer-implemented via hardware and/or software. As such, client systems and/or servers will include computerized components as known in the art. Such components typically include (among others) a processing unit, a memory, a bus, input/output (I/O) interfaces, external devices, etc.

While shown and described herein as a system and method for identifying spam avatar in a virtual universe through multimedia analysis, it is understood that the invention further provides various alternative embodiments. For example, in one embodiment, the invention provides a computer-readable/useable medium that includes computer program code to enable a system to identify spam avatar in a virtual universe through multimedia analysis. To this extent, the computer-readable/useable medium includes program code that implements each of the various process steps of the invention. It is understood that the terms computer-readable medium or computer useable medium comprises one or more of any type of physical embodiment of the program code. In particular, the computer-readable/useable medium can comprise program code embodied on one or more portable storage articles of manufacture (e.g., a compact disc, a magnetic disk, a tape, etc.), on one or more data storage portions of a computing device, such as memory and/or storage system (e.g., a fixed disk, a read-only memory, a random access memory, a cache memory, etc.), and/or as a data signal (e.g., a propagated signal) traveling over a network (e.g., during a wired/wireless electronic distribution of the program code).

In another embodiment, the invention provides a computer-implemented method for identifying spam avatar in a virtual universe through multimedia analysis. In this case, a computerized infrastructure can be provided and one or more systems for performing the process steps of the invention can be obtained (e.g., created, purchased, used, modified, etc.) and deployed to the computerized infrastructure. To this extent, the deployment of a system can comprise one or more of (1) installing program code on a computing device, such as computer system from a computer-readable medium; (2) adding one or more computing devices to the computer infrastructure; and (3) incorporating and/or modifying one or more existing systems of the computer infrastructure to enable the computerized infrastructure to perform the process steps of the invention.

As used herein, it is understood that the terms "program code" and "computer program code" are synonymous and mean any expression, in any language, code or notation, of a set of instructions intended to cause a computing device having an information processing capability to perform a particular function either directly before or after either or both of the following: (a) conversion to another language, code or notation; and/or (b) reproduction in a different material form. To this extent, program code can be embodied as one or more of: an application/software program, component software/a library of functions, an operating system, a basic I/O system/driver for a particular computing and/or I/O device, and the like.

In another embodiment, the invention provides a business method that performs the process steps of the invention on a subscription, advertising, and/or fee basis. That is, a service provider, such as a Solution Integrator, could offer to deploy a computer infrastructure in a virtual universe (VU) for identifying an advertising and/or an offering for sale of virtual and real goods and services masquerading as a computer controlled avatar by analyzing multimedia characteristics of the avatar. In this case, the service provider can create, maintain, support, etc., the computer infrastructure by integrating computer-readable code into a computing system, wherein the code in combination with the computing system is capable of performing the process steps of the invention for one or more customers. In return, the service provider can receive payment from the customer(s) under a subscription and/or fee agreement and/or the service provider can receive payment from the sale of advertising content to one or more third parties.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of the invention as defined by the accompanying claims.

What is claimed is:

1. A method in a virtual universe (VU) system for identifying spam avatars comprising the computer implemented steps of:
    providing a VU system comprising one or more avatars, wherein at least one of the one or more avatars has multimedia characteristics, the multimedia characteristics comprising a set of behavioral characteristics of the one of the one or more avatars, the set of behavioral characteristics comprising a relationship of a message conveyed by or to at least one avatar of the one or more avatars to a set of previous messages, the set of previous messages conveyed by or to at least one of: the at least one avatar, or at least one other avatar of the one or more avatars, wherein at least one of the one or more avatars is an automated, non-human controlled spam avatar generated by a commercial advertiser operating within the VU, and wherein the VU system has memory that stores multimedia characteristics of known spam avatars;
    receiving a modification to the one or more avatars;
    retrieving, in response to the modification, the multimedia characteristics from one of the one or more avatars having multimedia characteristics;
    comparing the retrieved multimedia characteristics with multimedia characteristics of known spam avatars;
    identifying similarities between the retrieved multimedia characteristics with the multimedia characteristics of known spam avatars; and
    determining whether the one of the one or more avatars is the automated, non-human controlled spam avatar generated by the commercial advertiser operating within the VU based upon the identified similarities of the set of behavioral characteristics of the one of the one or more avatars;
    wherein the relationship comprises at least one of:
        the message conveyed by or to the at least one avatar is unrelated to the set of previous messages,
        the message conveyed by or to the at least one avatar is related only to one previous message of the set of previous messages and not any other previous messages of the set of previous messages, and
        the message conveyed by or to the at least one avatar is related to a plurality of previous messages of the set of previous messages.

2. The method as defined in claim 1 further comprising the computer implemented step of commencing the retrieving step further upon one or more of an avatar creation, a user request, and a schedule, wherein the schedule may be fixed, random within a range, and modified based on a calculated spam score.

3. The method as defined in claim 1 further comprising the computer implemented step of calculating a spam score based upon identified similarities and determining whether the one of the one or more avatars is a spam avatar based upon the calculated spam score.

4. The method as defined in claim 3 wherein the VU memory further stores a spam score threshold, the method further comprising the computer implemented step of comparing the calculated spam score with the spam score threshold wherein the one of the one or more avatars is determined to be a spam avatar if the calculated spam score is equal to or greater than the spam score threshold.

5. The method as defined in claim 4 further comprising the computer implemented step of storing the calculated spam score and other information in the VU memory.

6. The method as defined in claim 1 further comprising the computer implemented steps of:
    calculating a spam score based upon identified similarities;
    determining whether the one of the one or more avatars has a previously stored spam score;
    if the one of the one or more avatars has a previously stored spam score, determining whether a set of previous similarities of the previously stored spam score are the same as the identified similarities;
    if the one of the one or more avatars does not have a previously stored spam score, using the calculated spam score to create a new spam score; and
    determining whether the one of the one or more avatars is a spam avatar based upon one of the following: the calculated spam score, and the new spam score.

7. The method as defined in claim 6 further comprising the computer implemented step of storing the new spam score, in the case that the one of the one or more avatars does not have a previously stored spam score, so that it is associated with the one of the one or more avatars.

8. The method as defined in claim 7 wherein each avatar has a unique identifier, the method further comprising the computer implemented step of storing the new spam score with the unique identifier of the one of the one or more avatars.

9. The method as defined in claim 1 wherein each avatar has a unique identifier, the method further comprising the computer implemented step of storing the unique identifier of the avatar determined to be a spam avatar in a spam avatar identification table.

10. The method as defined in claim 9 wherein at least one of the one or more avatars is not a spam avatar, the method further comprising the computer implemented step of distributing the spam avatar identification table to the at least one avatar that is not a spam avatar.

11. The method as defined in claim 1 wherein the multimedia characteristics comprise all of the following: a graphic and the multimedia characteristics of known spam avatars comprise trademarks of known spam avatars.

12. A spam avatar identification system in a virtual universe (VU) for identifying spam avatars, the VU comprising one or more avatars that each have multimedia characteristics, wherein at least one of the avatars is a spam avatar, the spam avatar identification system comprising:
    a hardware VU processing unit;
    a memory unit that stores multimedia characteristics of known spam avatars operating within the VU, the memory unit operably associated with the hardware VU processing unit, the multimedia characteristics comprising a set of behavioral characteristics of the one of the one or more avatars, the set of behavioral characteristics comprising a relationship of a message conveyed by or to at least one avatar of the one or more avatars to a set of previous messages, the set of previous messages conveyed by or to at least one of: the at least one avatar, or at least one other avatar of the one or more avatars;

a communications channel for allowing operation of the hardware VU processing unit, the memory unit and the multimedia characteristics analysis unit;

a multimedia characteristics analysis unit storable in the memory unit and having computer-readable code stored thereon, and when the computer-readable code is executed by the hardware processing unit, the computer-readable code causes the multimedia characteristics analysis unit to perform the steps comprising:
receiving a modification to the one or more avatars;
retrieving, in response to the modification, multimedia characteristics from an avatar, retrieving the multimedia characteristics of the known spam avatars from the memory unit, identifying similarities between the multimedia characteristics from the avatar and the multimedia characteristics of the known spam avatars and determining whether the avatar is an automated, non-human controlled spam avatar generated by a commercial advertiser operating within the VU based upon the identified similarities of the set of behavioral characteristics of the one of the one or more avatars;
wherein the relationship comprises at least one of:
the message conveyed by or to the at least one avatar is unrelated to the set of previous messages,
the message conveyed by or to the at least one avatar is related only to one previous message of the set of previous messages and not any other previous messages of the set of previous messages, and
the message conveyed by or to the at least one avatar is related to a plurality of previous messages of the set of previous messages.

13. The spam avatar identification system as defined in claim 12 wherein the computer-readable code causes the multimedia characteristics analysis unit to perform the step comprising recognizing the multimedia characteristics of the avatar that are graphical characteristics.

14. The spam avatar identification system as defined in claim 12 wherein the computer-readable code causes the multimedia characteristics analysis unit to perform the step comprising recognizing the multimedia characteristics of the avatar that are audio characteristics.

15. The spam avatar identification system as defined in claim 12 wherein at least one of the avatars is not a spam avatar, and wherein the memory further comprises a spam avatar identification table, which when the computer-readable code is executed by the hardware processing unit, the computer-readable code causes the spam avatar identification table to perform the steps comprising identifying the at least one avatar not being a spam avatar.

16. The spam avatar identification system as defined in claim 12 wherein the memory unit further comprises a scoring system for calculating a spam score based upon similarities between the multimedia characteristics from the avatar and the multimedia characteristics of the known spam avatars, wherein the memory unit the stores a spam score threshold and wherein computer-readable code causes the spam identification system to perform the steps comprising comparing the calculated spam score with the spam score threshold and determining that the avatar is a spam avatar if the spam score is equal to or exceeds the spam score threshold.

17. The spam avatar identification system as defined in claim 15, wherein the computer-readable code causes the spam avatar identification table to further perform the step comprising storing a unique identifier of known spam avatars.

18. The spam avatar identification system as defined in claim 16 wherein the memory unit further comprises a multimedia characteristics of known spam avatars table, and when the computer-readable code is executed by the hardware processing unit, the computer-readable code causes the multimedia characteristics of known spam avatars table to perform the step comprising storing a set of multimedia characteristics of known spam avatars.

19. A computer-readable storage device storing computer instructions, which when executed by a processor, causes a computer to:
receive a modification to one or more avatars;
retrieve, in response to the modification, multimedia characteristics from the one or more avatars, the VU system comprising one or more avatars that each have multimedia characteristics, the multimedia characteristics comprising a set of behavioral characteristics of the one of the one or more avatars, the set of behavioral characteristics comprising a relationship of a message conveyed by or to at least one avatar of the one or more avatars to a set of previous messages, the set of previous messages conveyed by or to at least one of:
the at least one avatar, or at least one other avatar of the one or more avatars, wherein at least one of the avatars is an automated, non-human controlled spam avatar generated by a commercial advertiser operating within the VU, the VU system having memory that stores multimedia characteristics of known spam avatars;
compare the retrieved multimedia characteristics with multimedia characteristics of known spam avatars;
identify similarities between the retrieved multimedia characteristics with multimedia characteristics of known spam avatars; and
determine whether the avatar is an automated, non-human controlled spam avatar generated by a commercial advertiser operating within the VU based upon the identified similarities of the set of behavioral characteristics of the one of the one or more avatars;
wherein the relationship comprises at least one of:
the message conveyed by or to the at least one avatar is unrelated to the set of previous messages,
the message conveyed by or to the at least one avatar is related only to one previous message of the set of previous messages and not any other previous messages of the set of previous messages, and
the message conveyed by or to the at least one avatar is related to a plurality of previous messages of the set of previous messages.

20. The computer-readable storage device as defined in claim 19 wherein the computer instructions, when executed by the processor, further cause the computer to: calculate a spam score based upon the similarities and determining whether the avatar is a spam avatar based upon the calculated spam score.

21. The computer-readable storage device as defined in claim 20 wherein the VU memory further stores a spam score threshold and wherein the computer instructions, when executed by the processor, further cause the computer to compare the calculated spam score with the spam score threshold wherein the avatar is identified as a spam avatar if the calculated spam score is equal to or greater than the calculated spam score.

* * * * *